United States Patent
Schnabel, Jr. et al.

(10) Patent No.: US 11,987,517 B2
(45) Date of Patent: May 21, 2024

(54) GLASS SHEET QUENCH ARRANGEMENT

(71) Applicant: GLASSTECH, INC., Perrysburg, OH (US)

(72) Inventors: James P. Schnabel, Jr., Maumee, OH (US); Dean M. Nitschke, Maumee, OH (US); David B. Nitschke, Perrysburg, OH (US)

(73) Assignee: Glasstech, Inc., Perrysburg, OH (US)

( * ) Notice: Subject to any disclaimer, the term of this patent is extended or adjusted under 35 U.S.C. 154(b) by 205 days.

(21) Appl. No.: 17/421,858

(22) PCT Filed: Jan. 10, 2020

(86) PCT No.: PCT/US2020/013081
§ 371 (c)(1),
(2) Date: Jul. 9, 2021

(87) PCT Pub. No.: WO2020/146729
PCT Pub. Date: Jul. 16, 2020

(65) Prior Publication Data
US 2022/0106219 A1    Apr. 7, 2022

Related U.S. Application Data

(60) Provisional application No. 62/790,976, filed on Jan. 10, 2019.

(51) Int. Cl.
*C03B 27/044* (2006.01)
*C03B 27/04* (2006.01)
*C03B 35/20* (2006.01)

(52) U.S. Cl.
CPC ...... *C03B 27/0447* (2013.01); *C03B 27/0404* (2013.01); *C03B 27/0417* (2013.01); *C03B 35/202* (2013.01)

(58) Field of Classification Search
CPC .. C03B 27/04; C03B 23/0357; C03B 27/0404
See application file for complete search history.

(56) References Cited

U.S. PATENT DOCUMENTS 3,294,518 A * 12/1966 Laseck ................ C03B 27/0447
65/114
3,762,902 A * 10/1973 Wagner ................ H01B 1/00
65/60.2

(Continued)

FOREIGN PATENT DOCUMENTS

CN    101535192 A    9/2009
CN    102007078 A    4/2011

(Continued)

OTHER PUBLICATIONS

Chinese Office Action (with English Machine Translation) dated Dec. 5, 2022, Application No. 202080008958.9, 18 Pages.

(Continued)

*Primary Examiner* — Alison L Hindenlang
*Assistant Examiner* — Steven S Lee
(74) *Attorney, Agent, or Firm* — Brooks Kushman P.C.

(57) ABSTRACT

A quench arrangement for quenching glass sheets includes a main quench station having upper and lower main quench heads for performing a primary quench operation on a glass sheet, a first lower secondary quench head located downstream of the main quench station, and a second lower secondary quench head located downstream of the first lower secondary quench head. The arrangement further includes an upper secondary quench system positioned above the first and second lower secondary quench heads, and the upper secondary quench system is cooperable with the lower secondary quench heads to perform further cooling of the glass sheet. The arrangement further includes a conveyor located above the second lower secondary quench (Continued)

head for moving the glass sheet away from the second lower secondary quench head.

32 Claims, 8 Drawing Sheets

(56) References Cited

U.S. PATENT DOCUMENTS

| | | | | |
|---|---|---|---|---|
| 4,225,333 | A | * | 9/1980 | Frank ................. C03B 27/0445 65/351 |
| 4,236,909 | A | * | 12/1980 | Thomas .............. C03B 27/0413 65/351 |
| 4,282,026 | A | | 8/1981 | McMaster et al. |
| 4,368,065 | A | * | 1/1983 | Frank ................. C03B 27/0442 65/273 |
| 4,430,111 | A | | 2/1984 | Claassen et al. |
| 4,444,579 | A | * | 4/1984 | Dunn ................. C03B 27/0404 65/273 |
| 4,526,605 | A | | 7/1985 | Frank et al. |
| 4,540,425 | A | * | 9/1985 | Bocelli .............. C03B 27/0435 65/273 |
| 4,557,745 | A | | 12/1985 | Halberschmidt et al. |
| 4,661,141 | A | | 4/1987 | Nitschke et al. |
| 4,767,434 | A | | 8/1988 | Schwartz et al. |
| 4,888,038 | A | * | 12/1989 | Herrington ......... C03B 27/0404 65/351 |
| 7,958,750 | B2 | | 6/2011 | Vild et al. |
| 8,074,473 | B2 | | 12/2011 | Nitschke et al. |
| 8,132,428 | B2 | | 3/2012 | Vild et al. |
| 8,534,096 | B2 | | 9/2013 | Bennett |
| 9,452,948 | B2 | | 9/2016 | Nitschke et al. |
| 2002/0189289 | A1 | * | 12/2002 | Shetterly ............ C03B 27/0417 65/351 |
| 2002/0189290 | A1 | * | 12/2002 | Bennett ................ C03B 35/202 65/273 |
| 2004/0216489 | A1 | * | 11/2004 | Maeda ................ C03B 27/0447 65/351 |
| 2006/0144090 | A1 | * | 7/2006 | Yoshizawa ........... C03B 35/161 65/288 |
| 2008/0127678 | A1 | | 6/2008 | Nitschke et al. |
| 2011/0277506 | A1 | * | 11/2011 | Lewandowski ..... C03B 23/0302 65/273 |
| 2012/0042695 | A1 | * | 2/2012 | Nitschke ............... C03B 25/025 65/348 |
| 2012/0291490 | A1 | * | 11/2012 | Yamakawa ......... C03B 23/0258 65/117 |

FOREIGN PATENT DOCUMENTS

| | | | | |
|---|---|---|---|---|
| JP | 2004010462 A | * | 1/2004 | ......... C03B 27/0413 |
| RU | 2448915 C2 | | 4/2012 | |
| WO | WO-0130711 A1 | * | 5/2001 | ......... C03B 23/0254 |
| WO | 02/24593 A1 | | 3/2002 | |
| WO | WO-2018220391 A1 | * | 12/2018 | ......... C03B 23/0235 |
| WO | WO-2019025078 A1 | * | 2/2019 | ........... C03B 23/023 |

OTHER PUBLICATIONS

Indian Office Action dated Dec. 29, 2022, Application No. 202117033567, 6 Pages.

Russian Acceptance Decision & Search Report (with Partial English Translation) dated Dec. 15, 2022, 22 Pages.

Extended European Search Report, dated Aug. 16, 2022, Application No./Patent No. 20738539.4-1005 / 3908556, Applicant Glasstech, Inc., 10 Pages.

PCT International Search Report, dated Mar. 10, 2020, Application No. PCT/US2020/013081, Applicant Glasstech, Inc., 2 Pages.

PCT Written Opinion of the International Searching Authority, dated Mar. 10, 2020, Application No. PCT/US2020/013081, Applicant Glasstech, Inc., 9 Pages.

PCT International Preliminary Report on Patentability, dated Jul. 22, 2021, Application No. PCT/US2020/013081, Applicant Glasstech, Inc., 11 Pages.

Brazilian Preliminary Examination Report re Patent App. No. BR112021013540-5, Applicant: Glasstech, Inc., Dec. 5, 2023 (with English machine translation) (8 pages).

Taiwanese Office Action re Patent App. No. TW109100788, Applicant: Glasstech, Inc., Jan. 4, 2024 (with English machine translation) (30 pages).

* cited by examiner

GLASS SHEET QUENCH ARRANGEMENT

CROSS-REFERENCE TO RELATED APPLICATIONS

This application is the U.S. national phase of PCT Application No. PCT/US2020/013081 filed on Jan. 10, 2020, which claims the benefit of U.S. provisional application Ser. No. 62/790,976 filed Jan. 10, 2019, the disclosures of which are hereby incorporated in their entireties by reference herein.

TECHNICAL FIELD

The present disclosure relates to a quench arrangement for quenching glass sheets.

BACKGROUND

Formed glass sheets may be quenched to enhance their mechanical properties. Such formed glass sheets may be used as vehicle side and back windows, as well as in other applications such as architectural applications. An example quench method and apparatus are disclosed in U.S. Pat. No. 8,074,473, which is hereby incorporated by reference in its entirety.

SUMMARY

A quench arrangement, according to the disclosure, for quenching glass sheets may include a main quench station having upper and lower main quench heads, a first lower secondary quench head located downstream of the main quench station, a second lower secondary quench head located downstream of the first lower secondary quench head, and an upper secondary quench system positioned above the first and second lower secondary quench heads. The quench arrangement may thither include a conveyor located above the second lower secondary quench head, a quench ring for receiving glass sheets, and an actuator configured to position the quench ring between the upper and lower quench heads of the main quench station, and to move the quench ring to a position above the first lower secondary quench head. The main quench station may be operable to cool a glass sheet when the glass sheet is positioned on the quench ring and located between the upper and lower main quench heads. The actuator may be operable to then move the quench ring to the position above the first lower secondary quench bead so that further cooling of the glass sheet may occur between the first lower secondary quench head and the upper secondary quench system. The quench arrangement may be operable to position the glass sheet above the second lower secondary quench head so that further cooling of the glass sheet may occur between the second lower secondary quench head and the upper secondary quench system. The conveyor may be operable to then move the glass sheet away from the second lower secondary quench head. Furthermore, at least one of the first lower secondary quench head, the second lower secondary quench head, or the upper secondary quench system may be movable laterally toward and away from the main quench station, based on size of the glass sheet or size of the main quench heads, to facilitate cooling of the glass sheet downstream of the main quench station.

A method according to the disclosure for quenching formed glass sheets in a quench arrangement may include moving a quench ring into a bending station to receive a heated and formed glass sheet, moving the glass sheet on the quench ring from the bending station to a main quench station so that the glass sheet is positioned between upper and lower main quench heads of the main quench station, and supplying cooling fluid through the upper and lower main quench heads to cool the glass sheet. The method may further include moving the glass sheet on the quench ring, to a position between a first lower secondary quench head and an upper secondary quench system, wherein the first lower secondary quench head is located downstream of the main quench station, and supplying cooling fluid through the first lower secondary quench head and the upper secondary quench system to further cool the glass sheet. In addition, the method may include moving the glass sheet to a position between a second lower secondary quench head and the upper secondary quench system, wherein the second lower secondary quench head is located downstream of the first lower secondary quench head, and supplying cooling fluid through the second lower secondary quench head and the upper secondary quench system to further cool the glass sheet. The method may also include moving the glass sheet away from the second lower secondary quench head via a transfer conveyor. Furthermore, at least one of the first lower secondary quench head, the second lower secondary quench head, or the upper secondary quench system may be movable laterally toward and away from the main quench station, based on size of the glass sheet or size of the main quench heads, to facilitate cooling of the glass sheet downstream of the main quench station.

While exemplary embodiments are illustrated and disclosed, such disclosure should not be construed to limit the claims. It is anticipated that various modifications and alternative designs may be made without departing from the scope of the disclosure.

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art.

During manufacture of a glass sheet product, such as a glass mirror panel for a solar power collection application, a vehicle rear window, side window, or any other suitable product, it may be desirable to quench heated sheets of glass to enhance mechanical properties. For example, glass sheets may be quenched to provide tempering or strengthening. In the present disclosure, methods and apparatuses are provided for efficiently quenching glass sheets to improve glass processing.

Figure 1:
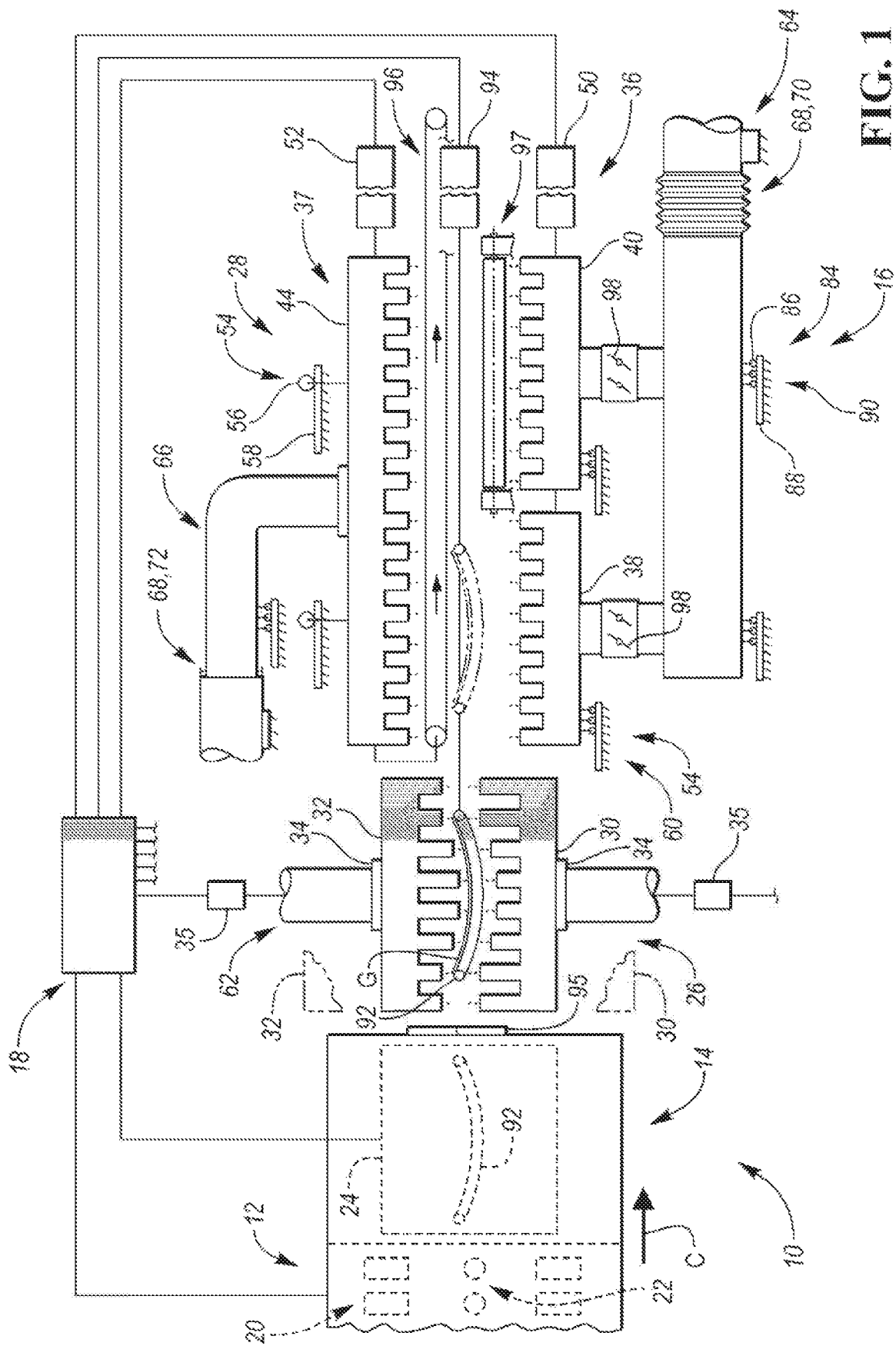
FIG. 1 is a schematic view of a glass processing system including a heating station for heating glass sheets, a bending station for bending the glass sheets, and a quench arrangement according to the present disclosure for quenching the heated and formed glass sheets, wherein the quench arrangement includes a main quench station and a secondary quench station located downstream of the main quench station in a direction of conveyance of the glass sheets, and wherein the main quench station is shown with upper and lower main quench heads of a first size.

Referring to FIG. 1, a glass processing system 10 is shown for processing glass sheets G. The system 10 includes a heating apparatus or station, such as a furnace 12, for heating the glass sheets G; a forming or bending station 14 for forming or bending each glass sheet G into a desired shape; a cooling arrangement, such as a quench system or arrangement 16, configured to cool each glass sheet G; and a control system 18 for controlling operation of the furnace 12, the bending station 14 and the quench arrangement 16.

The furnace 12 may have any suitable configuration for heating the glass sheets G. For example, the furnace 12 may include any suitable heating elements 20 positioned above and/or below a conveyor 22 (e.g., roller conveyor system), which may be used to convey the glass sheets G in a direction of conveyance C through the furnace 12. As a more detailed example, the heating elements 20 may include radiant heating elements, such as electric heaters, and/or convective heating elements, such as hot gas or hot air distributors.

Likewise, the bending station 14 may have any suitable configuration for forming or bending each glass sheet G into a particular shape. For example, the bending station 14 may have a conveyor (not shown), which may be a separate conveyor system or part of the conveyor 22, for receiving a heated glass sheet G; and a bending apparatus 24, shown schematically in FIG. 1, for bending the glass sheet G. The bending apparatus 24 may include one or more suitable molds, such as an upper press mold and a lower peripheral press ring. The bending apparatus 24 may further include one or more actuators for vertically moving the press mold relative to the press ring and/or for vertically moving the press ring relative to the press mold when the press mold and press ring are aligned with each other. With such a configuration, the glass sheet G may be press bent between a curved surface of the upper press mold and the press ring, for example. Additional details of example forming or bending stations are disclosed in U.S. Pat. Nos. 4,282,026, 4,661,141, 7,958,750, 8,132,428 and 9,452,948, which are hereby incorporated in their entirety by reference.

The quench arrangement 16 is configured to receive each glass sheet G from the bending station 14, and quench each glass sheet G for heat strengthening or tempering or to simply cool each glass sheet. G, for example. In the embodiment shown in FIG. 1, the quench arrangement 16 includes a primary or main quench station 26 and a secondary quench station 28 located downstream of the main quench station 26 in the direction of conveyance C.

The main quench station 26 includes lower and upper main quench heads 30 and 32, respectively, mounted on quench head mounts 34 that are movably attached to a support structure so that the main quench heads 30, 32 are movable between a dosed position shown in solid lines, and an open position partially illustrated in phantom lines. For example, each main quench head 30, 32 may be connected to an actuator 35 for moving the main quench head 30, 32 toward and away from the other main quench head 30, 32. Furthermore, in the illustrated embodiment, each main quench head 30, 32 has the same general shape as each glass sheet G to be quenched, and each main quench head 30, 32 has multiple outlets for providing cooling fluid to the glass sheet G.

The secondary quench station 28 includes lower and upper secondary quench systems 36 and 37, respectively. The lower secondary quench system 36 includes a first lower secondary quench head 38, such as a first lower blow-off head, located downstream of the main quench station. 26 in the direction of conveyance C, and a second lower secondary quench head 40, such as a second lower blow-off head, located downstream of the first lower secondary quench head 38 in the direction of conveyance C. The upper secondary quench system 37 is positioned above the first and second lower secondary quench heads 38 and 40, respectively, and the upper secondary quench system 37 is configured to cooperate with the lower secondary quench heads 38 and 40 to further cool each glass sheet G. In the embodiment shown in FIG. 1, the upper secondary quench system 37 includes a single upper secondary quench head 44 that extends over the lower secondary quench heads 38, 40, and each secondary quench head 38, 40, 44 has multiple outlets for providing cooling fluid to each glass sheet G. Furthermore, each secondary quench head 38, 40, 44 may have a generally flat quench face that faces a glass sheet G to be quenched, and the upper secondary quench head 44 may be spaced away from the lower secondary quench heads 38 and 40 by about 19 to 23 cm (e.g., 21.6 cm). As another example, one or more of the secondary quench heads 38, 40, 44 may have a curved quench face having the same general shape as a glass sheet G to be quenched.

Figure 2:
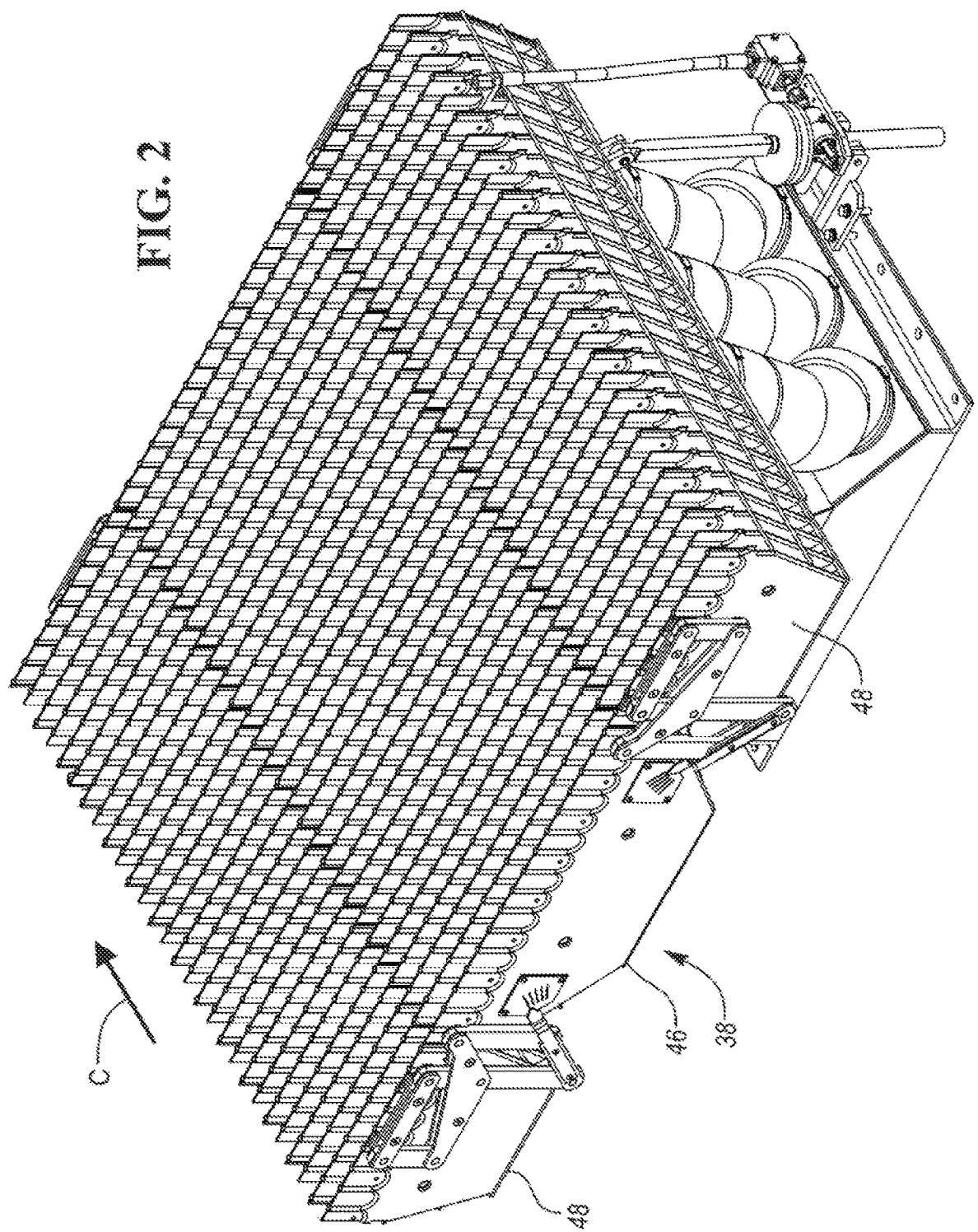
FIG. 2 is a perspective view of a first lower secondary quench head of the secondary quench station, wherein the first lower secondary quench head includes a first lower secondary quench head body, and two wings positioned on opposite sides of the first lower secondary quench head body.
Figure 3:
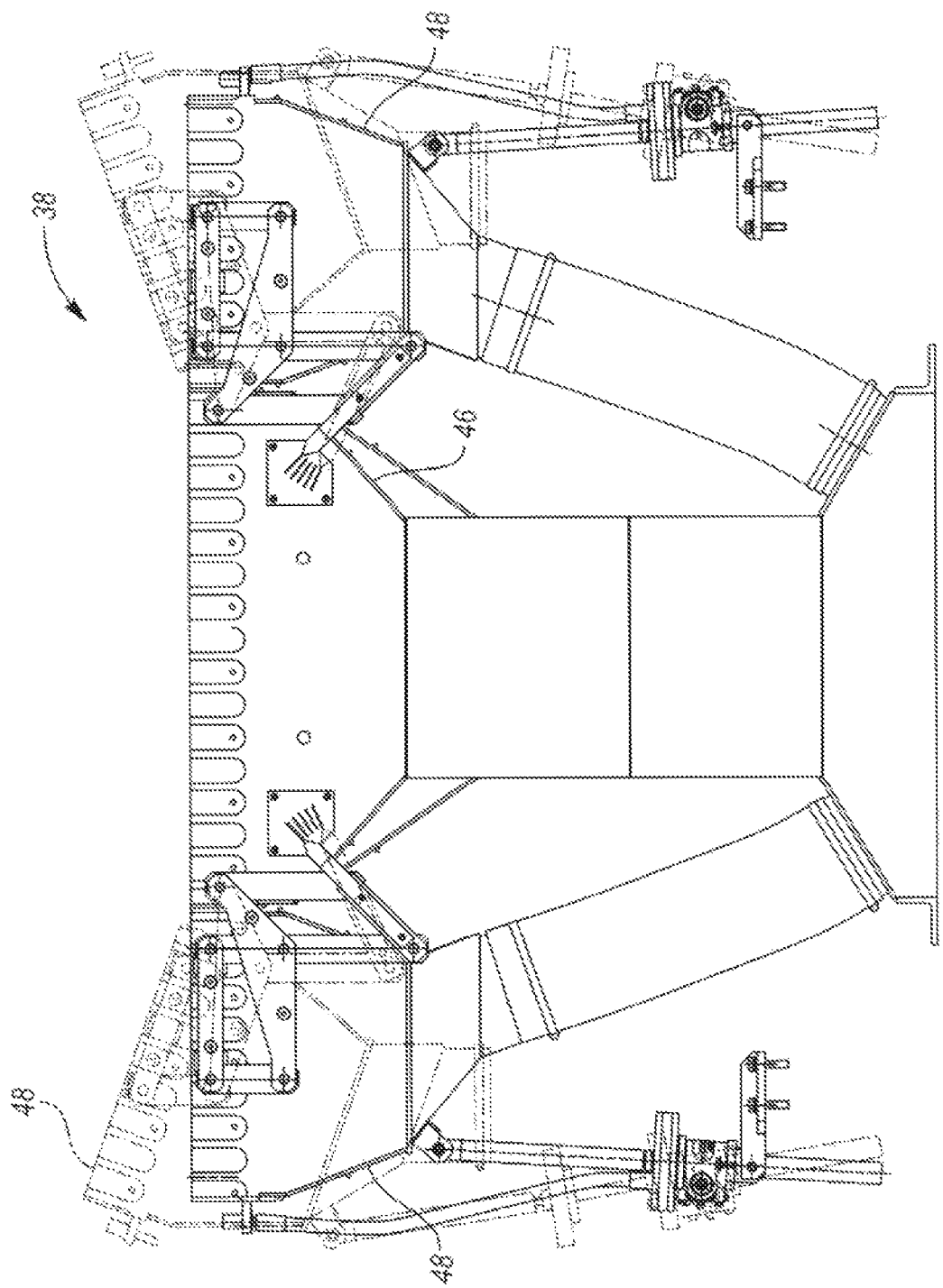
FIG. 3 is an devotional view of the first lower secondary quench head shown in FIG. 2, wherein the wings are each movable from a flat position, shown in solid lines, to a raised position, shown in phantom lines.

Referring to FIGS. 2 and 3, one or more of the secondary quench heads 38, 40, 44 may include movable wings for changing shape of the corresponding quench face. In the embodiment shown in FIGS. 2 and 3, the first lower secondary quench head 38 includes a first lower secondary quench head body 46 and movable wings 48 pivotally attached on opposite sides of the first lower secondary quench head body 46 and that extend in the direction of conveyance C. Referring to FIG. 3, each wing 48 is pivotable about an axis that extends in the direction of conveyance C from a flat position, shown in solid lines, to a raised position, shown in phantom lines, for changing shape of the quench face of the first lower secondary quench head 38 in a direction perpendicular to the direction of conveyance C. For example, when the wings 48 are each in the raised position, the first lower secondary quench head 38 may have a flat main portion and angled side portions. The second lower secondary quench head 40 and/or the upper secondary quench head 44 may likewise have a similar configuration.

Returning to FIG. 1, at least one of the first lower secondary quench head 38, the second lower secondary quench head 40, or the upper secondary quench system 37 (e.g., the upper secondary quench head 44) may be movable laterally toward and away from the main quench station 26, based on size of the glass sheets G to be quenched and/or size of the main quench heads 30 and 32, to facilitate cooling of the glass sheets G downstream of the main quench station 26. In the illustrated embodiment, all of the secondary quench heads 38, 40 and 44 are movably mounted on one or more support structures so that the secondary quench heads 30, 40 and 44 are movable toward and away from the main quench station 26. For example, the lower secondary quench heads 38 and 40 may be fixedly connected together and to an actuator 50 for moving both lower secondary quench heads 38 and 40 together and relative to a support structure toward and away from the main quench station 26. Furthermore, the upper secondary quench head 44 may be connected to an actuator 52 for moving the upper secondary quench head 44 relative to a support structure toward and away from the main quench station 26. In another embodiment, one or more actuators may be used to move the secondary quench heads 38, 40 and 44 together as one unit.

The quench arrangement 16 further includes one or more movement facilitating systems, such as glide and bearing systems or roller systems, for moving the at least one of the first lower secondary quench head 38, the second lower secondary quench head 40, or the upper secondary quench system 37 (e.g., the upper secondary quench head 44) laterally toward and away from the main quench station 26. In the illustrated embodiment, the quench arrangement 16 includes one or more roller systems 54 for each of the lower secondary quench heads 38, 40 and the upper secondary quench head 44 for enabling movement of the secondary quench heads 38, 40, 44 toward and away from the main quench station 26. As a more specific example, each roller system 54 may include one or more rollers 56 rotatably attached to a secondary quench head 38, 40, 44, and a corresponding guide 58, such as a rail or track, attached to a stationary support structure 60 for guiding movement of the rollers 56. In another embodiment, each roller system 54 may include one or more rollers attached to a support structure, and a corresponding guide attached to a secondary quench head 38, 40, 44 and that is movable with respect to the rollers.

In addition, the quench arrangement 16 includes one or more fluid supply systems for supplying cooling fluid such as air to the main quench station 26 and the secondary quench station 28. In the illustrated embodiment, the quench arrangement 16 includes a main fluid supply system 62 for supplying cooling fluid to each of the main quench heads 30, 32, a lower secondary fluid supply system 64 for supplying cooling fluid to the lower secondary quench heads 38 and 40, and an upper secondary fluid supply system 66 for supplying cooling fluid to the upper secondary quench head 44.

At least one of the lower secondary fluid supply system 64 or the upper secondary fluid supply system 66 may include a movable portion 68 configured to adjust a configuration of the fluid supply system 64, 66 to compensate for movement of the corresponding secondary quench head or heads 38, 40, 44. In the illustrated embodiment, the lower secondary fluid supply system. 64 and the upper secondary fluid supply system 66 each include a movable portion 68 configured to adjust length of the corresponding secondary fluid supply system 64, 66 to accommodate movement of the lower secondary quench heads 38, 40 and the upper secondary quench head 44.

Each movable portion 68 may have any suitable configuration, such as a bellows portion or a telescopic portion. In the embodiment shown in FIG. 1, the lower secondary fluid supply system 64 includes a bellows portion 70, and the upper secondary fluid supply system 66 comprises a telescopic portion 72. In another embodiment, the lower secondary fluid supply system 64 and the upper secondary fluid supply system 66 may each include either a bellows portion 70 or a telescopic portion 72.

Figure 4:
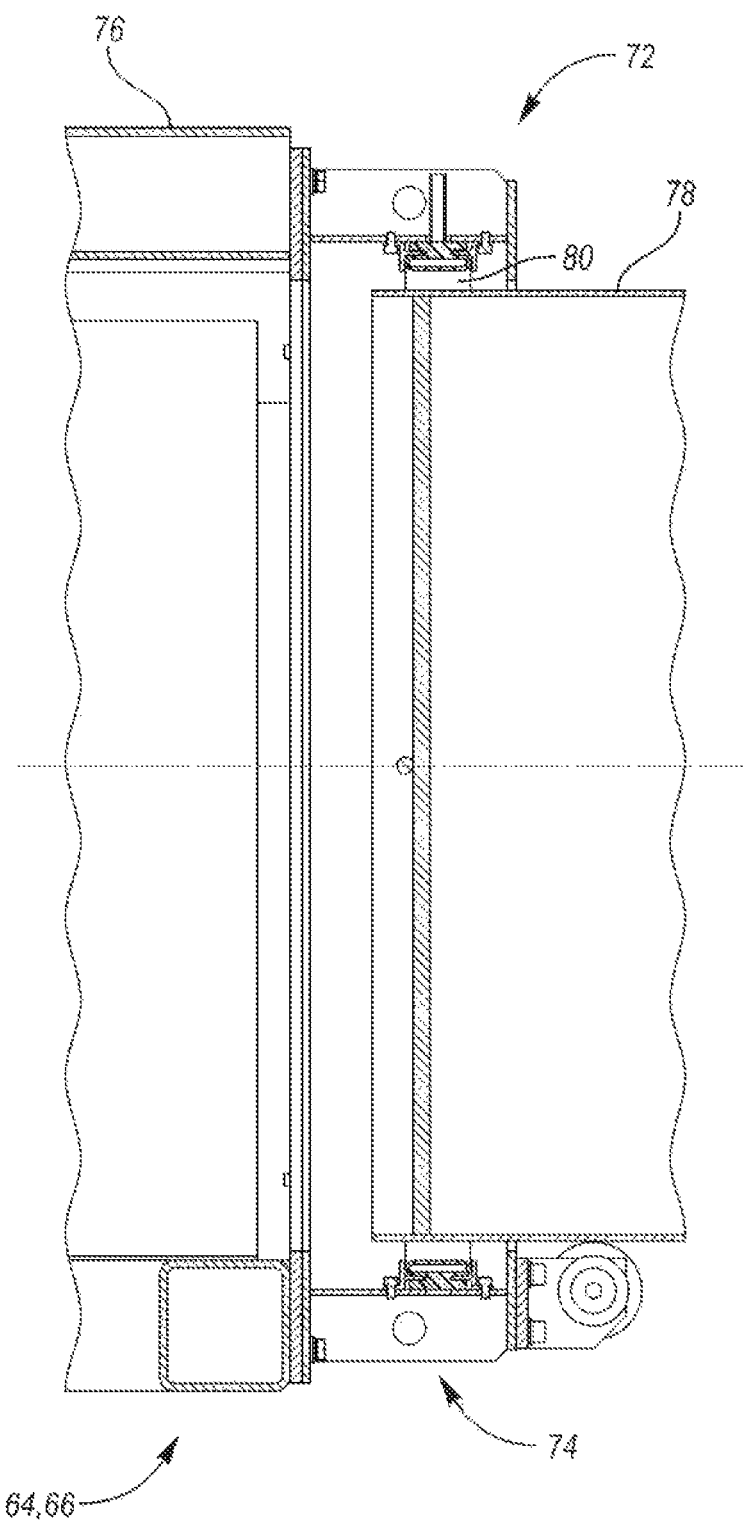
FIG. 4 is a cross-sectional view of a portion of a fluid supply system of the quench arrangement including a movable telescopic portion.

An example telescopic portion 72 is shown in more detail in FIG. 4. In that embodiment, the telescopic portion 72 includes an overlapping section 74 connected to a first section 76 (e.g., first duct section) of a particular secondary fluid supply system 64, 66, and the overlapping section 74 is configured to overlap a second section 78 (e.g., second duct section) of the secondary fluid supply system 64, 66 having a smaller size (e.g., diameter or perimeter) than the first section 76 of the secondary fluid supply system 64, 66. The telescopic portion 72 also includes a pneumatic seal 80 attached to the overlapping section 74. The pneumatic seal 80 is connected to a fluid supply source (not shown) that is operable to inflate the pneumatic seal 80 when the first and second sections 76 and 78, respectively, of the secondary fluid supply system 64, 66 are in desired positions relative to each other, and to deflate the pneumatic seal 80 to allow one of the sections 76, 78 to move with respect to the other section 76, 78 to adjust the length of the secondary fluid supply system 64, 66. In the illustrated embodiment, the second section 78 of the secondary fluid supply system 64, 66 is telescopically received in the first section 76 of the secondary fluid supply system 64, 66.

Returning to FIG. 1, the quench arrangement 16 may further include one or more movement facilitating systems, such as glide and bearing systems or roller systems, for facilitating movement of the secondary fluid supply systems 64, 66. In the illustrated embodiment, the quench arrangement 16 includes a roller system 84 for each of the lower secondary fluid supply system 64 and the upper secondary fluid supply system 66 for enabling movement of the secondary fluid supply system 64, 66. As a more specific example, each roller system 84 may include one or more rollers 86 rotatably attached to a section (e.g., duct section) of a particular secondary fluid supply system. 64, 66, and one or more corresponding guides 88, such as rails, attached to a stationary support structure 90 for guiding movement of the rollers 86. In another embodiment, each roller systems 84 may include one or more rollers attached to a support structure, and a corresponding guide attached to a section (e.g., duct section) of a particular secondary fluid supply system 64, 66 and that is movable with respect to the rollers. Furthermore, a portion of each secondary fluid supply system 64, 66 may be configured to move based on movement of the corresponding secondary quench head 38, 40, 44. In another embodiment, the quench arrangement 16 may include one or more additional actuators configured to move one portion of each secondary fluid supply system 64, 66 with respect to another portion of the secondary fluid supply system 64, 66.

The quench arrangement 16 further includes a quench ring 92 for receiving glass sheets G at the bending station 14, and an actuator 94 connected to, or otherwise associated with, the quench ring 92 and configured to move the quench ring 92 between the bending station 14, the main quench station 26 and the secondary quench station 28. For example, the actuator 94 may be connected to a quench ring shuttle that supports the quench ring 92, and the actuator 94 may be operable to position the quench ring 92 (dashed-line position) under the press mold of the bending apparatus 24 to receive a glass sheet G after a bending operation. The actuator 94 may then move the quench ring 92 with the glass sheet G supported thereon through an opening (which is shown covered by doors 95 in FIG. 1) in a wall of the bending station 14 and to a position between the lower and upper main quench heads 30 and 32, respectively, of the main quench station 26 for an initial quenching operation. Next, the actuator 94 may move the quench ring 92 with the glass sheet G supported thereon to a position (shown in phantom lines) above the first lower secondary quench head 38 so that further cooling of the glass sheet G may occur between the first lower secondary quench head 38 and the upper secondary quench system 37 (e.g., the upper secondary quench head 44).

In addition, the quench arrangement 16 includes an upper conveyor 96 positioned between the upper secondary quench head 44 and the first and second lower secondary quench heads 38 and 40, respectively, and a lower conveyor 97 located above the second lower secondary quench head 40. The upper conveyor 96 is configured to move the glass sheet G from a position above the first lower secondary quench head 38 to a position above the second lower secondary quench head 40, as explained below in greater detail, so that further cooling of the glass sheet G may occur between the second lower secondary quench head 40 and the upper secondary quench head 44. The lower conveyor 97 is operable to then move the glass sheet G away from the second lower secondary quench head 40 for further cooling or so that the glass sheet G may be offloaded from the lower conveyor 97 for storage or further processing, for example.

In the illustrated embodiment, the upper conveyor 96 is a perforated belt conveyor that is configured to move the glass sheet G in the direction of conveyance C, and the upper conveyor 96 is attached to or otherwise supported by the upper secondary quench system 37 (e.g., the upper secondary quench head 44). Furthermore, the lower conveyor 97 is a roller conveyor that is configured to move the glass sheets G in a direction perpendicular to the direction of conveyance C (e.g., into or out of the paper in the embodiment shown in FIG. 1), and the lower conveyor 97 is attached to or otherwise supported by the second lower secondary quench head 40. In another embodiment, the upper conveyor 96 and the lower conveyor 97 may each be any suitable conveyor system (e.g., roller conveyor or belt conveyor). Furthermore, the lower conveyor 97 may be configured to move the glass sheets G in any suitable direction (e.g., in a direction parallel to the direction of conveyance C).

The lower and upper secondary quench systems 36 and 37, respectively, may each include the respective secondary quench heads, as well as all associated components. For example, the lower secondary quench system 36 may include the lower secondary quench heads 38 and 40, the roller systems 54, the lower secondary fluid supply system 64, the associated roller systems 84, and the lower conveyor 97. Likewise, the upper secondary quench system 37 may include the upper secondary quench head 44, the associated roller systems 54, the upper secondary fluid supply system 66, the associated roller systems 84, and the upper conveyor 96.

The control system 18 mentioned above may include a bundle of connections for connecting with the various components of the glass processing system 10, such as the furnace 12 (e.g., heating elements 20 and the conveyor 22), the bending station 14 (e.g., the bending apparatus 24 and associated actuators and shuttles), and the quench arrangement 16 (e.g., the actuators 35, 50, 52 and 94, the fluid supply systems 62, 64 and 66, the conveyors 96 and 97, etc.). Furthermore, the control system 18 may include any suitable hardware and/or software for controlling operation of the above components in order to perform the press forming and quenching of each glass sheet G (e.g., for performing the particular algorithms represented by the functions described herein). For example, the control system 18 may include one or more processors in communication with one or more storage devices or memory units, which include computer readable program instructions that are executable by the one or more processors so that the control system 18 may control operation of the furnace 12, the bending station 14, the quench arrangement 16, etc. The control system 18 may also, or instead, include one or more application specific integrated circuits, programmable gate arrays, programmable logic devices, and/or digital signal processors. In lieu of the connections, the control system 18 may instead be connected wirelessly to one or more of the above components.

Operation of the glass processing system 10 will now be described in more detail. First, based on a size of each glass sheet G (e.g., height or dimension in the direction of conveyance C of each glass sheet G) to be quenched in the quench arrangement 16, correspondingly sized lower and upper main quench heads 30 and 32, respectively, may be selected and mounted on the mounts 34 of the main quench station 26 shown in FIG. 1. In that regard, the main quench heads 30, 32 may each have a particular size and shape that matches the size and shape of each glass sheet G to be quenched.

During mounting, of the main quench heads 30, 32, the secondary quench station 28 may be moved away from the main quench station 26. After the main quench heads 30 and 32 have been mounted on the mounts 34, the secondary quench station 28 may be moved toward the main quench station 26 so that the first lower secondary quench head 38 and the upper secondary quench head 44 are positioned proximate the lower main quench head 30 and the upper main quench head 32, respectively, (e.g., about 5 to 7.5 cm away from the respective main quench head 30, 32). For example, the lower secondary quench heads 38 and 40 and the upper secondary quench head 44 may be moved toward or away from the main quench station 26 using the actuators 50 and 52 and roller systems 54. As mentioned above, the fluid supply systems 64, 66 may also be configured to facilitate such movement. For example, the movable portion 70, 72 of each fluid supply system 64, 66 may allow the fluid supply system 64, 66 to adjust in length based on movement of the associated secondary quench head 38, 40, 44, and the roller systems 84 may facilitate movement of one section of a particular fluid supply system 64, 66 with respect to another section of the fluid supply system 64, 66.

Processing of glass sheets G may include sequentially loading glass sheets G onto the conveyor 22 of the furnace 12, and heating the glass sheets G as they are conveyed through the furnace 12 in the direction of conveyance C. Next, a respective glass sheet G may be transferred to the bending station. 14 where it may be pressed or formed into a desired shape by closing the bending apparatus 24. When the bending apparatus 24 is then opened (e.g., the upper press mold and the lower press ring are moved away from each other), the glass sheet G may be retained on the upper press mold such as by vacuum applied to the upper press mold. The quench ring 92 may then be moved between the upper press mold and the lower press ring (see the dashed-line position of the quench ring 92), and the vacuum may be reduced to allow the glass sheet G to be transferred from the upper press mold to the quench ring 92.

Next, the quench ring 92 may be moved by the actuator 94 to a position between the main quench heads 30 and 32, and the main quench heads 30 and 32 may be moved toward each other so that each main quench head 30, 32 is positioned approximately 40 to 60 ram (e.g., 50 mm) away from the glass sheet G in order to perform a main quench operation. For example, if the glass sheet G has a thickness of 3.8 mm and an initial temperature of 643° C. after exiting the bending station 14, air at a temperature in the range of 26 to 45° C. (e.g., ambient plant air) and an initial pressure in the range of 25 to 30 inches water column (IWC) may be supplied to each of the main quench heads 30, 32 by the corresponding main fluid supply system 62, so that the main quench heads 30 and 32 may direct the air toward the glass sheet G for about 0.5 to 1 second (e.g., approximately 0.75 seconds) in order to perform initial cooling of the glass sheet G. The initial air pressure may be selected to maintain a temporary glass sheet surface tension in the range of about 14 to 20 MPa, since greater than necessary air pressure may negatively impact performance of the quench arrangement 16 through higher glass breakage and possibly more pronounced iridescence in the glass sheet G. This initial cooling may be referred to as a first quench stage.

Next, the air pressure may be increased in and exiting from the main quench heads 30 and 32 by 20 to 100% (e.g., 50 to 100%) for 2 to 2.75 seconds (e.g., 2.2 to 2.5 seconds) in order to increase the cooling rate of the glass sheet G to reduce the quench time without negatively impacting performance of the quench arrangement 16 through higher glass breakage and possibly more pronounced iridescence in the glass sheet G. For example, if the glass sheet G has a thickness of 3.8 mm, the air pressure in an exiting from the main quench heads 30 and 32 may be increased to a pressure in the range of 40 to 60 IWC. This further cooling in the main quench station 26 may be referred to as a second quench stage.

The main quench heads 30 and 32 may then be moved to the open position, and the quench ring 92 with the glass sheet G supported thereon may be transferred to a position (shown in phantom lines) between the first lower secondary quench head 38 and the upper secondary quench head 44 so that further cooling of the glass sheet G may occur between the first lower secondary quench head 38 and the upper secondary quench system 37. For example, the glass sheet G may be cooled for 2.4 to 3.4 seconds so that the glass sheet G continues to be cooled without interruption, as explained below in further detail.

Next, the quench arrangement 16 is operable to position the glass sheet G above the second lower secondary quench head 40 of the secondary quench station 28 so that further cooling of the glass sheet G may occur between the second lower secondary quench head 40 and the upper secondary quench system 37. For example, the glass sheet G may be cooled between the second lower secondary quench head 40 and the upper secondary quench head 44 for 2.7 to 7.3 seconds so that the glass sheet U reaches a temperature below 400° C., as explained below in further detail.

In the embodiment shown in FIG. 1, the lower secondary fluid supply system 64 and the upper secondary fluid supply system 66 are configured to cooperate to facilitate transfer of the glass sheet U from the quench ring 92 to the upper conveyor 96 when the quench ring 92 is positioned above the first lower secondary quench head 38, so that the upper conveyor 96 may then operate to move the glass sheet U to a position between the second lower secondary quench head 40 and the upper secondary quench head 44 further cooling. The lower secondary fluid supply system 64 and the upper secondary fluid supply system. 66 are also configured to cooperate to facilitate transfer of the glass sheet G from the upper conveyor 96 to the lower conveyor 97 after the glass sheet G has been moved to a position above the second lower secondary quench head 40, so that the lower conveyor 97 may then move the glass sheet U away from the second lower secondary quench head 40 for further cooling or so that the glass sheet G may be offloaded from the lower conveyor 97 for storage or further processing.

As a more specific example, the pressure of the fluid supplied to the upper secondary quench head 44 by the upper secondary fluid supply system 66 may be kept constant. For example, the fluid pressure in the upper secondary quench head 44 may be in the range of 5 to 7 WC, such as 6 IWC. The lower secondary fluid supply system 64, however, may control the fluid pressure in the lower secondary quench heads 38 and 40 to different pressures using dampers 98, for example. In the illustrated embodiment, the lower secondary fluid supply system 64 includes first and second fluid supply sections connected to the first and second lower secondary quench heads 38 and 40, respectively, and each fluid supply section includes one or more dampers 98 for varying fluid pressure to the respective lower secondary quench head 38, 40. In that regard, fluid pressure in the lower secondary fluid supply system 64 may range from 20 to 35 IWC (e.g., from 26 to 30 IWC), for example, but the dampers 98 may be controlled to different open positions or closed positions to alter or vary the pressures in the lower secondary quench heads 38 and 40. In one embodiment, the fluid pressure in the first lower secondary quench head 38 may vary from 4 IWC to 35 IWC (e.g., 6 IWC to 30 IWC) and the fluid pressure in the second lower secondary quench head 40 may vary from 0 IWC to 35 IWC (e.g., 0 IWC to 30 IWC), for example. When the glass sheet G on the quench ring 92 is indexed to the position above the first lower secondary quench head 38, the pressure in and exiting from the upper secondary quench head 44 may be 5 to 7 IWC (e.g., 6 IWC), and the pressure in and exiting from the first lower secondary quench head 38 may also be 5 to 7 IWC (e.g., 6 IWC) so that the glass sheet G will remain on the quench ring 92. After the glass sheet G is fully positioned above the first lower secondary quench head 38, then the fluid pressure in and exiting from the first lower secondary quench head 38 may be increased to 26 to 30 IWC, for example, so that the glass sheet G may be lifted from the quench ring 92 onto the upper conveyor 96 to allow the quench ring 92 to return to the bending station 14 to get the next glass sheet. This difference in pressure is sufficient to lift the glass sheet. G to the upper conveyor 96 and continue cooling on both top and bottom surfaces of the glass sheet G. The glass sheet G may remain in the location above the first lower secondary quench head 38 for up to 3.2 seconds to allow a downstream glass sheet, if any, to be transferred from the upper conveyor 96 to the lower conveyor 97 and conveyed away from above the second lower secondary quench head 40. The fluid pressure in and exiting from the second lower secondary quench head 40 may then be raised to 26 to 30 IWC, for example, so that the upper conveyor 96 can transfer the glass sheet G to the position over the second lower secondary quench head 40 for further cooling between the second lower secondary quench head 40 and the upper secondary quench head 44. Once the glass sheet G is moved away from the first lower secondary quench head 38, the fluid pressure in and exiting from the first lower secondary quench head 38 may be reduced to 5 to 7 IWC (e.g., 6 IWC) to accept the next glass sheet entering the secondary quench station 28. Furthermore, once sufficient cooling of the glass sheet G has occurred between the second lower secondary quench head 40 and the upper secondary quench head 44, the fluid pressure in and exiting from the second lower secondary quench head 40 may be reduced (e.g., to at or near 0 IWC), in order to transfer the glass sheet G from the upper conveyor 96 to the lower conveyor 97, so that the lower conveyor 97 may transport the glass sheet G away from the second lower secondary quench head 40.

All of the further cooling in the secondary quench station 28 may be referred to as a third quench stage. Furthermore, the fluid (e.g., air) supplied by each of the secondary fluid supply systems 64, 66 may be ambient temperature or temperature conditioned fluid. For example, each secondary fluid supply system 64, 66 may supply air at a temperature in the range of 26 to 45° C. In addition, the lower secondary fluid supply system 64 may include any suitable means for providing different fluid pressures to the lower secondary quench beads 38 and 40. For example, the lower secondary fluid supply system 64 may include a separate fluid supply source for each lower secondary quench head 38, 40.

Figure 5:
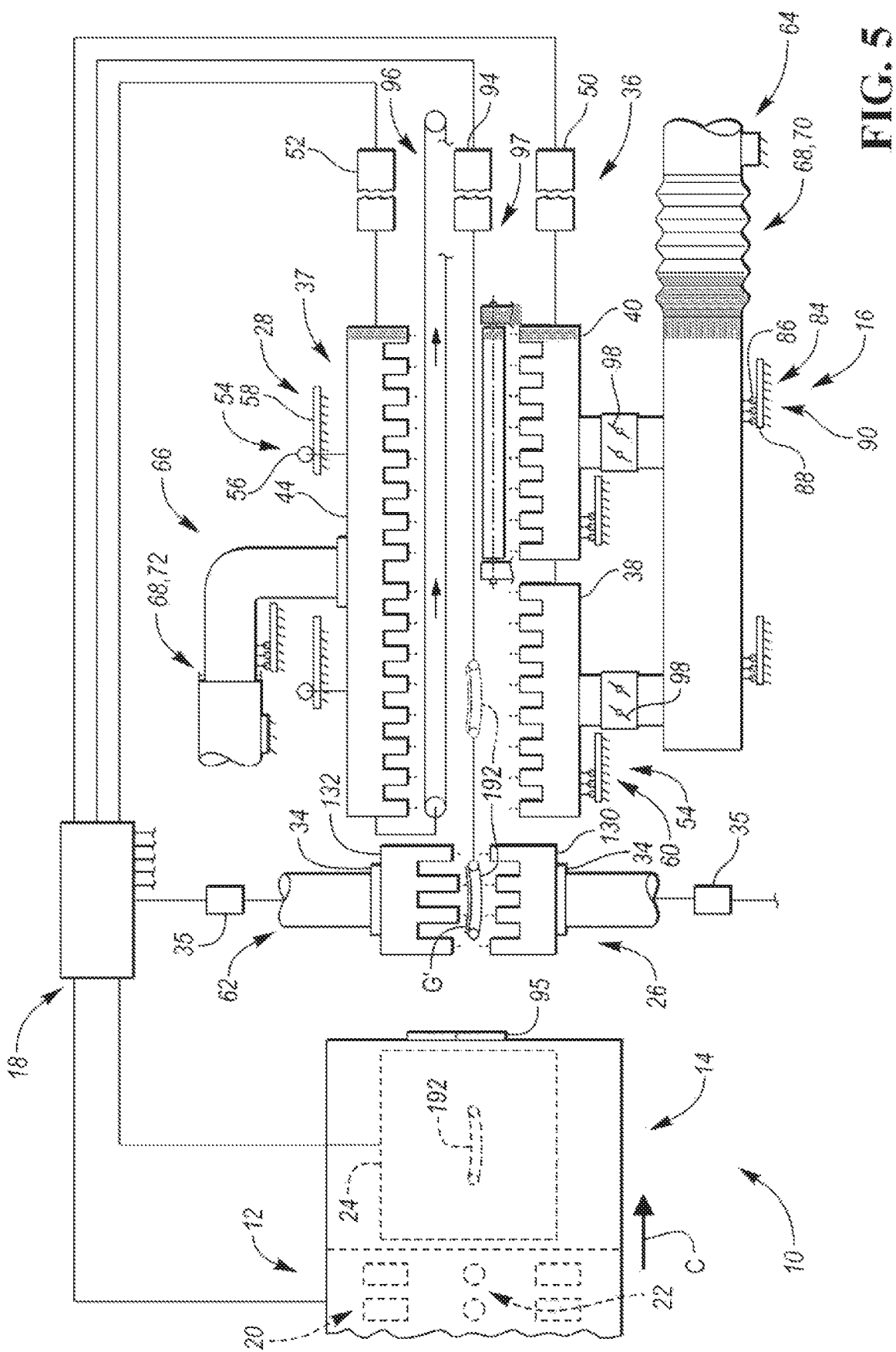
FIG. 5 is a schematic view of the glass processing system of FIG. 1, but with the main quench station including upper and lower main quench heads of a second size smaller than the first size for quenching glass sheets having a dimension in the direction of conveyance that is smaller than a corresponding dimension of the glass sheets quenched by the main quench station shown in FIG. 1, wherein the secondary quench station is shown moved toward the bending station to compensate for the smaller size of the main quench heads.

Referring to FIG. 5, when it is desired to process glass sheets G' that are smaller in size (e.g., smaller height or dimension in the direction of conveyance C) as compared to the glass sheet G shown in. FIG. 1, the main quench station. 26 may be provided with lower and upper main quench heads 130 and 132, respectively, that are appropriately sized for the glass sheets G. In order to swap out the main quench heads, the secondary quench heads 38, 40 and 44 may first be moved away from the quench station 26. After the main quench heads 130 and 132 have been mounted on the mounts 34, the secondary quench station 28 may be moved toward the main quench station 26 so that the first lower secondary quench head 38 and the upper secondary quench head 44 are positioned proximate the lower main quench head 130 and the upper main quench head 132, respectively, (e.g., about 5 to 7.5 cm away from the respective main quench head 130, 132).

As shown in 5, a smaller quench ring 192 may also be used to transport glass sheets G' between the bending station. 14, the main quench station 26 and the secondary quench station 28. Operation of the glass processing system 10 may then proceed in a similar manner as described above with respect to FIG. 1.

With the quench arrangement 16 according to the disclosure, spacing between the main quench station 26 and the secondary quench station 28 may be kept constant regardless of the size of the main quench heads used in the main quench station 26. Therefore, quenching operations can efficiently and effectively occur regardless of the size of the glass sheets being quenched, and without experiencing increased glass temperatures while glass sheets are being transferred between the main quench station 26 and the secondary quench station 28. As a result, continuous cooling of glass sheets may occur in and between the quench stations 26 and 28 so that improved tempering may occur (e.g., sufficient particle count test results may be achieved). Furthermore, with the above configuration in which a tempering process may be initiated in the main quench station 26 and completed in the secondary quench station 28, with continuous cooling in the quench stations 26 and 28 and without an interruption in cooling between the quench stations 26 and 28, quench times for achieving full temper may be reduced compared to typical quench times. For example, the tempering process for a particular glass sheet may be reduced from 12 seconds to 10 seconds.

Figure 6A:
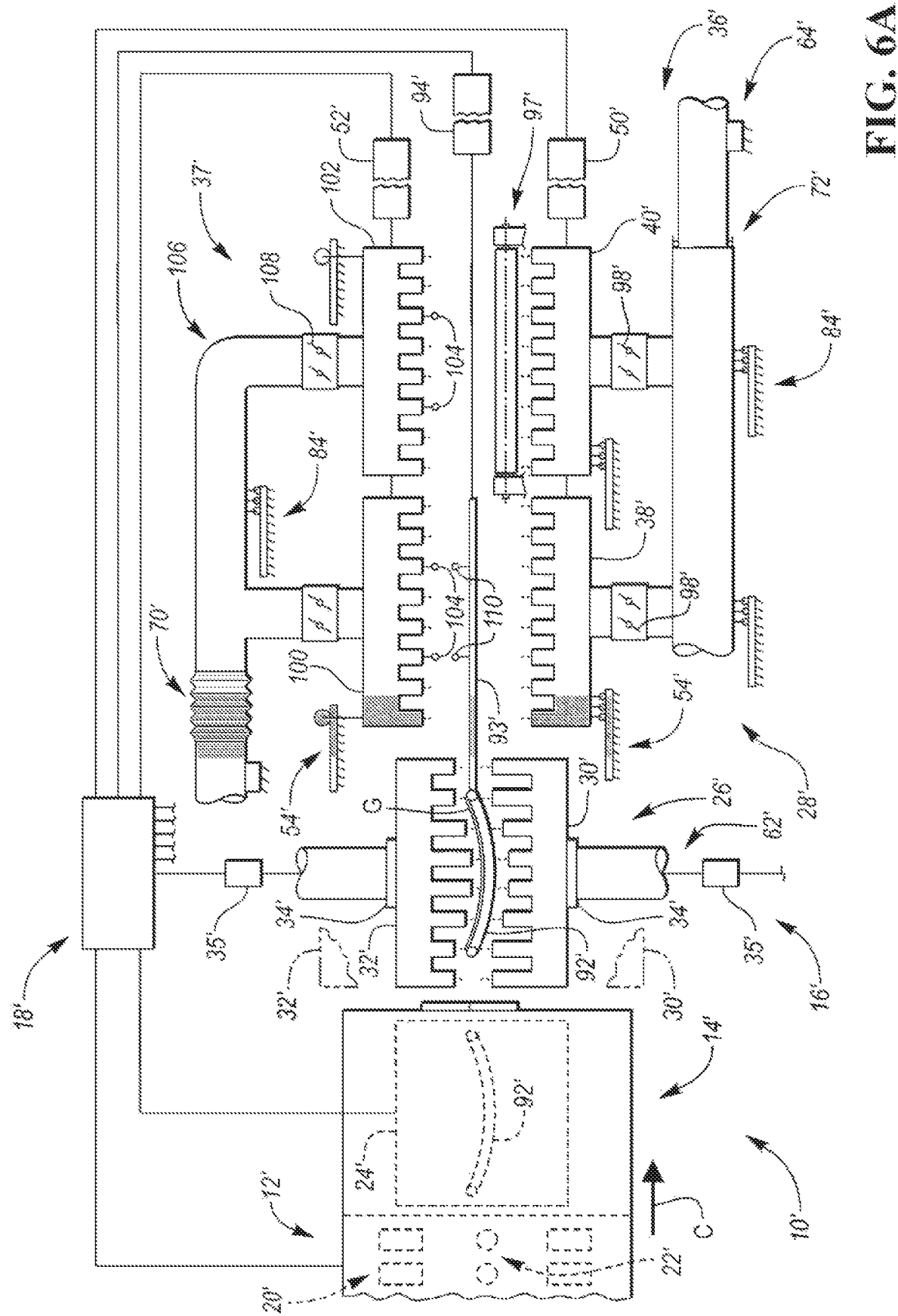
FIG. 6A is a schematic view of a glass processing system including a heating station for heating glass sheets, a bending station for bending the glass sheets, and a second embodiment of a quench arrangement according to the present disclosure for quenching the heated and formed glass sheets, wherein the quench arrangement includes a main quench station and a secondary quench station located downstream of the main quench station in a direction of conveyance of the glass sheets, and wherein the main quench station is shown with upper and lower main quench heads of a first size.
Figure 6B:
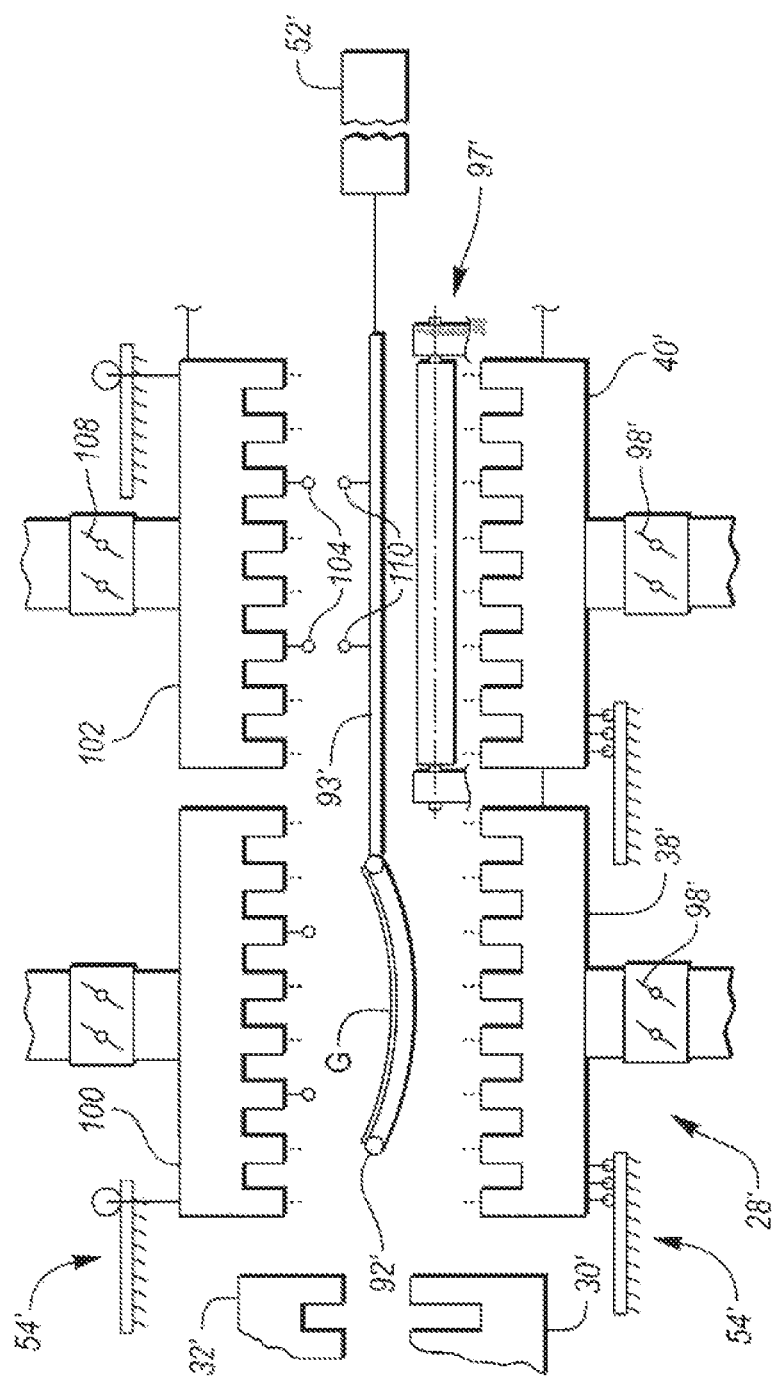
FIG. 6B is an enlarged portion of the glass processing system shown in FIG. 6A, showing a quench ring and corresponding quench shuttle shifted downstream compared to the positions of those components shown in FIG. 6A.

A second embodiment 10' of a glass processing system according to the disclosure is shown in FIGS. 6A and 6B. The glass processing system 10' includes a heating station, such as a furnace 12' which may be the same as or similar to the furnace 12 described above, a bending station 14' which may be the same as or similar to the bending station 14 described above, a second embodiment 16' of a quench arrangement according to the disclosure, and a control system 18', which may be the same as or similar to the control system 18 described above, for controlling operation of the furnace 12', the bending station 14' and the quench arrangement 16'.

The quench arrangement 16' includes a primary or main quench station 26' and a secondary quench station 28' located downstream of the main quench station. 26' in a direction of conveyance C. The main quench station 26' is the same as or similar to the main quench station 26 described above with respect to the quench arrangement 16, and similar components are identified with similar reference numbers, but those similar reference numbers each include a prime mark in FIGS. 6A and 6B.

The secondary quench station 28' includes lower and upper secondary quench systems 36' and 37', respectively. The lower secondary quench system 36' may be the same as or similar to the lower secondary quench system 36 described above with respect to the quench arrangement 16, and similar components are identified with similar reference numbers, but those similar reference numbers in FIGS. 6A and 6B each include a prime mark. In the embodiment shown in FIG. 6A, however, the lower secondary fluid supply system 64' includes a movable portion configured as a telescopic portion 72', rather than a bellows portion 70 as shown in FIG. 1.

The upper secondary quench system 37' includes some similar components as the upper secondary quench system 37', and those similar components are identified with the same reference numbers that each include a prime mark in FIGS. 6A and 6B. In the embodiment shown in FIGS. 6A and 6B, the upper secondary quench system 37' includes first and second upper secondary quench heads 100 and 102, respectively, that may be fixedly connected together so that they are movable together by the actuator 52'. The first and second upper secondary quench heads 100 and 102, respectively, may be spaced away from the first and second lower secondary quench heads 38' and 40', respectively, by about 9 to 20 cm (e.g., 17 cm). Furthermore, the upper secondary quench system 37' includes one or more upper support members 104, such as support tubes or bars, positioned between each upper secondary quench head 100, 102 and the corresponding lower secondary quench bead 38', 40' for receiving glass sheets G, as explained below in more detail. For example, multiple upper support members 104 may be attached to each upper secondary quench head 100, 102 so that the upper support members 104 extend below a corresponding quench face of the upper secondary quench head 100, 102.

The upper secondary quench system 37' also has an upper secondary fluid supply system 106 for supplying fluid to the upper secondary quench heads 100, 102. Like the lower secondary fluid supply system 64', the upper secondary fluid supply system 106 may control the fluid pressure in the upper secondary quench heads 100, 102 to different pressures using dampers 108 or any other suitable means. In the illustrated embodiment, the upper secondary fluid supply system 106 includes first and second fluid supply sections connected to the first and second upper secondary quench heads 100 and 102, respectively, and each fluid supply section includes one or more dampers 108 for varying fluid pressure to the respective upper secondary quench head 100, 102.

The quench arrangement 16' also includes a quench ring 92' mounted on a quench shuttle 93' that is connected to actuator 94'. In the embodiment shown in FIGS. 6A and 6B, the quench shuttle 93' includes one or more lower support members 110, such as support tubes or bars, attached to a portion of the shuttle 93' located downstream of the quench ring 92' for receiving a glass sheets G as explained below in more detail.

Operation of the glass processing system 10' will now be described in more detail with reference to FIGS. 6A and 6B. Glass sheets G may be initially processed in a similar manner as described above with respect to the glass processing system 10. After a primary quench operation is performed on a first glass sheet C in the main quench station 26', the first glass sheet C may be transferred by the quench ring 92' to a position above the first lower secondary quench head 38' for further cooling, as shown in FIG. 6B. The first glass sheet C may then be blown or lifted upwardly from the quench ring 92' to the upper support members 104 on the first upper secondary quench head 100. Next, the quench ring 92' may be returned to the bending station 14' to receive a second glass sheet. After the second glass sheet is moved on the quench ring 92' to a quench position between the main quench heads 30' and 32', the first glass sheet. C may be blown down or lowered onto the lower support members 110 on the quench shuttle 93'. Then, as the quench ring 92' carries the second glass sheet from the main quench station 26' to a position above the first lower secondary quench head 38', the first glass sheet G may be carried simultaneously by the quench shuttle 93' from a position above the first lower secondary quench head 38' to a position above the second lower secondary quench head 40' for still further cooling. When the first glass sheet C is positioned between the second lower secondary quench head 40' and the second upper secondary quench head 102, the first glass sheet G is blown or lifted upwardly to the stationary upper support members 104 on the second upper secondary quench head 102. The first glass sheet G is held against the upper support members 104 on the second upper secondary quench head 102 as the quench ring 92' is returned to the bending station 14' to pick up a third glass sheet. After the lower support members 110 on the quench shuttle 93' clear the second lower secondary quench head 40', the first glass sheet G is blown down or lowered to the lower conveyor 97' by increasing fluid pressure or fluid flow in the second upper secondary quench head 102. Then, just before the quench shuttle 93' moves the second glass sheet over the second lower secondary quench head 40', the first glass sheet C may be transported on the lower conveyor 97' away from the second lower secondary quench head 40' for further cooling, or the first glass sheet C may be offloaded from the lower conveyor 97' for storage or further processing, for example.

The secondary fluid supply systems 64' and 106 are cooperable with each other to facilitate transfer of each glass sheet C to the various positions described above in connection with the secondary quench station 28'. For example, by increasing a relative pressure difference between a particular lower secondary quench head 38', 40' and a corresponding upper secondary quench head 100, 102, a glass sheet G may be lifted upwardly. Likewise, by reducing a relative pressure difference between a particular lower secondary quench head 38', 40' and a corresponding upper secondary quench head 100, 102, a glass sheet C may lowered. Furthermore, because both secondary fluid supply systems 64' and 106 are capable of supplying variable fluid pressure to the corresponding secondary quench heads 38' and 40' or 100 and 102, glass sheet movement can be optimized.

As a more specific example, fluid pressure in each secondary fluid supply system 64', 106 may range from 20 to 35 IWC (e.g., from 26 to 30 IWC, but the corresponding dampers 98', 108 may be controlled to different open positions or closed positions to alter the pressures in the corresponding secondary quench heads 38', 40' or 100, 102. In one embodiment, the fluid pressure in the first lower secondary quench head 38' may vary from 20 IWC to 35 IWC (e.g., 26 IWC to 30 IWC), the fluid pressure in the second lower secondary quench head 40' may vary from 5 IWC to 25 IWC (e.g., 12 IWC to 17 IWC), the fluid pressure in the first upper secondary quench head 100 may vary from 4 IWC to 35 IWC (e.g., 6 IWC to 30 IWC), and the fluid pressure in the second upper secondary quench head 102 may vary from 0 IWC to 20 IWC (e.g., 3 IWC to 16 IWC), for example.

When the first glass sheet G mentioned above is supported on the quench ring 92' and positioned between the first lower secondary quench head 38' and the first upper secondary quench head 100, the first glass sheet G may be lifted off of the quench ring 92' and up to the upper support members 104 on the first upper secondary quench head 100, before the quench ring 92' returns to the bending station 14' for the second glass sheet, by changing the fluid pressure (e.g., air pressure) in and exiting from the first upper secondary quench head 100 from 28-32 IWC to 4-8 IWC (e.g., 30 IWC to 6 IWC) and changing the fluid pressure in and exiting from the first lower secondary quench head 38' from 24-28 IWC to 28-32 IWC (e.g., 26 IWC to 30 IWC), for example. In other words, the fluid pressure may be changed from 28-32 IWC over 24-28 IWC (e.g., 30 IWC over 26 IWC) to 4-8 IWC over 28-32 IWC (e.g., 6 IWC over 30 IWC). Then, as the second glass sheet reaches the quench position in the main quench station 26' and before it starts to oscillate (e.g., after about 5 to 6 seconds from the time that the first glass sheet G was blown up to the upper support members 104 on the first upper secondary quench head 100), the first glass sheet G may be blown down or transferred onto the lower support members 110 on the quench shuttle 93' by changing the fluid pressure back from 4-8 IWC over 28-32 IWC (e.g., 6 IWC over 30 IWC) to 28-32 IWC over 24-28 IWC (e.g., 30 IWC over 26 IWC). Next, after primary quenching of the second glass sheet has been completed in the main quench station 26' (e.g., after about 8 to 9 seconds from the time that the first glass sheet G was blown up to the upper support members 104 on the first upper secondary quench head 100), as the quench ring 92' carries the second glass sheet from the main quench station 26' to the position above the first lower secondary quench head 38', the first glass sheet G is carried simultaneously by the quench shuttle 93' from the position above the first lower secondary quench head 38' to the position above the second lower secondary quench head 40', while the fluid pressure in the second upper secondary quench head 102 is controlled to 14-18 IWC (e.g., 16 IWC) and the fluid pressure in the second lower secondary quench head 40' is controlled to 10-14 IWC (e.g., 12 IWC). As a result, the greater part of the available cooling fluid of each secondary fluid supply system 64', 106 can be directed to the corresponding first secondary quench head 38', 100, where it may have a bigger effect on tempering (e.g., higher resultant particle count). Once positioned above the second lower secondary quench head 40', the first glass sheet G may be blown up or lifted to the upper support members 104 on the second upper secondary quench head 102 by changing the fluid pressure from 14-18 IWC in the second upper secondary quench head 102 over 10-14 IWC in the second lower secondary quench head 40' (e.g., 16 IWC over 12 IWC) to 1-5 IWC over 15-19 IWC (e.g., 3 IWC over 17 IWC. The first glass sheet G is then held at that position for about 0.8 to 2 seconds until the lower support members 110 on the quench shuttle 93' move away from above the second lower secondary quench head 40' as the quench ring 92' returns to the bending station 14' for the third glass sheet. At that time, the first glass sheet G is blown down to the lower conveyor 9T by changing the fluid pressure back from 1-5 IWC over 15-19 IWC (e.g., 3 IWC over 17 IWC) to 14-18 IWC over 10-14 IWC (e.g., 16 IWC over 12 IWC). The first glass sheet. G may then be held in that position until the last instant (e.g., about 3 to 5 seconds), and then is indexed away from the second lower secondary quench head 40' by the lower conveyor 97' just before the lower support members 110 on the back end of the quench shuttle 93' return to the position above the second lower secondary quench head 40' with the second glass sheet. The above process may continue until all desired glass sheets G have been processed.

The fluid (e.g., air) supplied by each of the secondary fluid supply systems 64', 106 may be ambient temperature or temperature-conditioned fluid. For example, each secondary fluid supply system 64', 106 may supply air at a temperature in the range of 26 to 45° C. Furthermore, each secondary fluid supply system 64', 106 may include any suitable means for providing different fluid pressures to the respective secondary quench heads 38', 40' or 100, 102. For example, each secondary fluid supply system 64', 106 may include a separate fluid supply source for each respective secondary quench head 38', 40' or 100, 102.

Figure 7:
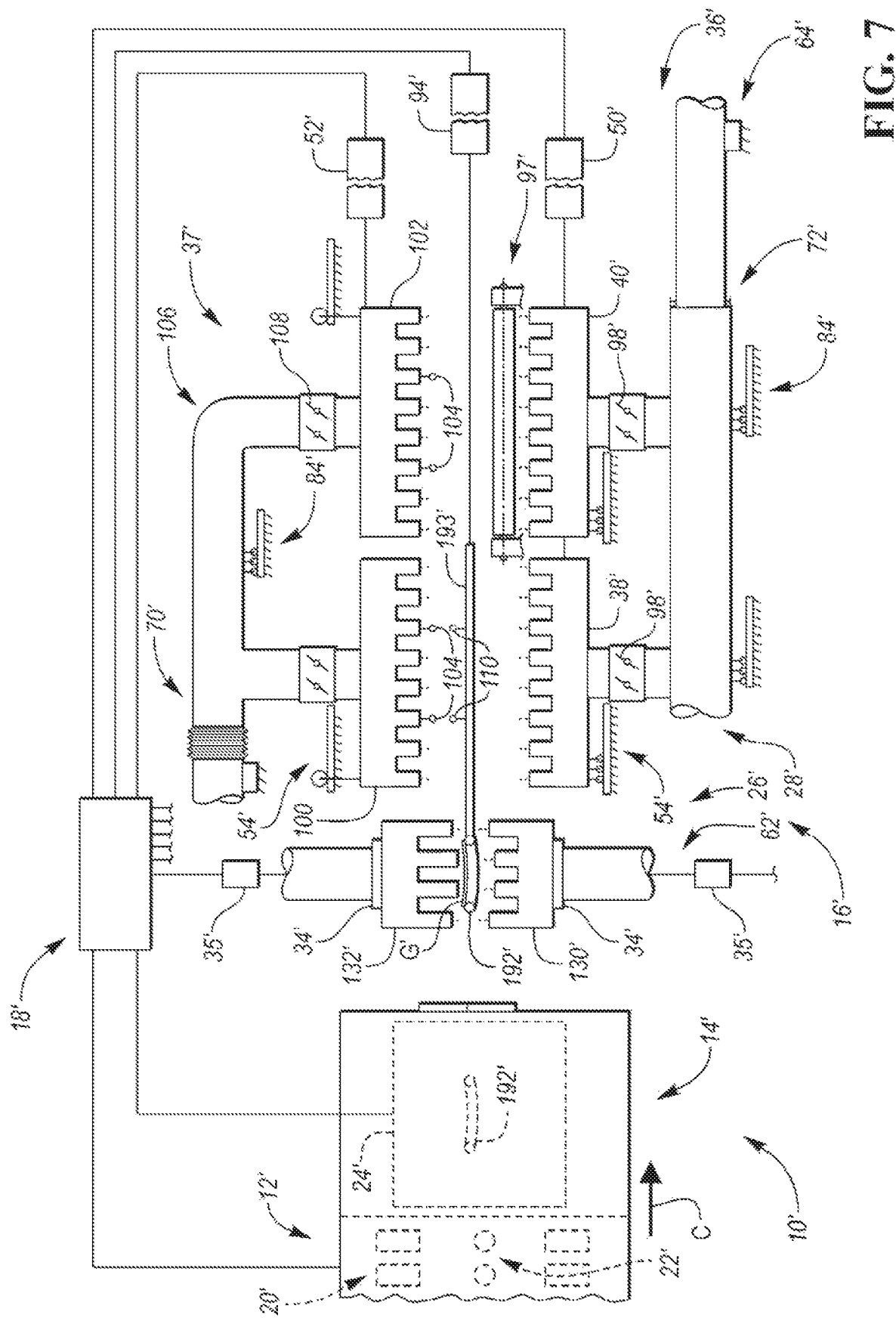
FIG. 7 is a schematic view of the glass processing system of FIG. 6A, but with the main quench station including upper and lower main quench heads of a second size smaller than the first size for quenching glass sheets having a dimension in the direction of conveyance that is smaller than a corresponding dimension of the glass sheets quenched by the main quench station shown in FIG. 6A, wherein the secondary quench station is shown moved toward the bending station to compensate for the smaller size of the main quench heads.

Referring to FIG. 7, when it is desired to process glass sheets G' that are smaller in size (e.g., smaller height or dimension in the direction of conveyance C) as compared to the glass sheet G shown in FIG. 6A, the main quench station 26' may be provided with lower and upper main quench heads 130' and 132', respectively, that are appropriately sized for the glass sheets G'. In order to swap out the main quench heads, the secondary quench heads 38', 40', 100, 102 may first be moved away from the quench station 26' in a similar manner as described above with respect to the secondary quench station 28 of the quench arrangement 16. After the main quench heads 130', 132' have been mounted on the mounts 34', the secondary quench station. 28' may be moved toward the main quench station 26' so that the first lower secondary quench head 38' and the first upper secondary quench head. 100 are positioned proximate the lower main quench head 130' and the upper main quench head 132', respectively, (e.g., about 5 to 7.5 cm away from the respective main quench head 130', 132').

As shown in FIG. 7, a smaller quench ring 192' may also be used to transport glass sheets G' between the bending station 14', the main quench station 26' and the secondary quench station 28'. Operation of the glass processing system 10 may then proceed in a similar manner as described above with respect to FIGS. 6A and 6B.

Again with the quench arrangement 16' according to the disclosure, spacing between the main quench station 26' and the secondary quench station 28' may be kept constant regardless of the size of the main quench heads used in the main quench station 26'. Therefore, quenching operations can efficiently and effectively occur regardless of the size of the glass sheets being quenched, and without allowing an interruption in cooling while glass sheets are being transferred between the main quench station 26' and the secondary quench station 28'. Furthermore, with the above configuration in which a tempering process may be initiated in the main quench station 26' and completed in the secondary quench station 28', with continuous cooling in the quench stations 26' and 28' and without an interruption in cooling between the quench stations 26' and 28', quench times for achieving full temper may be reduced compared to typical quench times. For example, the tempering process for a particular glass sheet may be reduced from 12 seconds to 10 seconds.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A quench arrangement for quenching glass sheets, the quench arrangement comprising:
    a main quench station having upper and lower main quench heads;
    a first lower secondary quench head located downstream of the main quench station;
    a second lower secondary quench head located downstream of the first lower secondary quench head;
    an upper secondary quench system positioned above the first and second lower secondary quench heads so that the upper secondary quench system extends over the first and second lower secondary quench heads;
    a conveyor located above the second lower secondary quench head;
    a quench ring for receiving glass sheets; and
    an actuator configured to position the quench ring between the upper and lower main quench heads of the main quench station, and to move the quench ring to a position above the first lower secondary quench head;
    wherein the main quench station is operable to cool a glass sheet when the glass sheet is positioned on the quench ring and located between the upper and lower main quench heads, the actuator is operable to then move the quench ring to the position above the first lower secondary quench head so that further cooling of the glass sheet may occur between the first lower secondary quench head and the upper secondary quench system, the quench arrangement is operable to position the glass sheet above the second lower secondary quench head so that further cooling of the glass sheet may occur between the second lower secondary quench head and the upper secondary quench system, and the conveyor is operable to then move the glass sheet away from the second lower secondary quench head, and wherein at least one of the first lower secondary quench head, the second lower secondary quench head, or the upper secondary quench system is movable laterally toward and away from the main quench station, based on size of the glass sheet or size of the main quench heads, to facilitate cooling of the glass sheet downstream of the main quench station, and wherein the quench arrangement is operable to supply cooling fluid through the second lower secondary quench head and the upper secondary quench system when the glass sheet is positioned above the second lower secondary quench head so that the further cooling of the glass sheet may occur between the second lower secondary quench head and the upper secondary quench system.

2. The quench arrangement of claim 1 further comprising a fluid supply system for supplying cooling fluid to the at least one of the first lower secondary quench head, the second lower secondary quench head, or the upper secondary quench system, wherein the fluid supply system includes a movable portion configured to adjust a configuration of the fluid supply system.

3. The quench arrangement of claim 2 wherein the movable portion of the fluid supply system comprises a pneumatic seal.

4. The quench arrangement of claim 1 further comprising a roller system for facilitating movement of the at least one of the first lower secondary quench head, the second lower secondary quench head, or the upper secondary quench system laterally toward and away from the main quench station.

5. The quench arrangement of claim 1 further comprising an actuator for moving the at least one of the first lower secondary quench head, the second lower secondary quench head, or the upper secondary quench system laterally toward and away from the main quench station.

6. The quench arrangement of claim 1 further comprising an additional conveyor positioned between the upper secondary quench system and the first and second lower secondary quench heads, the additional conveyor being configured to move the glass sheet from a position above the first lower secondary quench head to a position above the second lower secondary quench head.

7. The quench arrangement of claim 6 further comprising a fluid supply system for supplying cooling fluid to each of the first and second lower secondary quench heads, and an additional fluid supply system for supplying cooling fluid to the upper secondary quench system, wherein the fluid supply system and the additional fluid supply system are configured to cooperate to facilitate transfer of the glass sheet from the quench ring to the additional conveyor when the quench ring is positioned above the first lower secondary quench head, and to facilitate transfer of the glass sheet from the additional conveyor to the conveyor after the glass sheet has been moved to a position above the second lower secondary quench head.

8. The quench arrangement of claim 7 wherein the fluid supply system is configured to supply cooling fluid at a variable pressure to each of the first and second lower secondary quench heads, and the additional fluid supply system is configured to supply cooling fluid at a constant pressure to the upper secondary quench system.

9. The quench arrangement of claim 7 further comprising at least one actuator for moving the first and second lower secondary quench heads toward and away from the main quench station, and for moving the upper secondary quench system toward and away from the main quench station.

10. The quench arrangement of claim 9 wherein the fluid supply system comprises a movable portion configured to adjust length of the fluid supply system, and the additional fluid supply system comprises an additional movable portion configured to adjust length of the additional fluid supply system.

11. The quench arrangement of claim 10 wherein each movable portion is configured as a telescopic portion that includes a pneumatic seal.

12. The quench arrangement of claim 6 wherein the conveyor is positioned below the quench ring, and the additional conveyor is positioned above the quench ring.

13. The quench arrangement of claim 12 wherein the additional conveyor comprises a belt conveyor.

14. The quench arrangement of claim 1 further comprising a quench shuttle that supports the quench ring, at least one lower support member attached to a portion of the quench shuttle located downstream of the quench ring, at least one upper support member positioned between the first lower secondary quench head and the upper secondary quench system, and a fluid supply system for supplying cooling fluid to the first lower secondary quench head, wherein the fluid supply system is operable to facilitate transfer of the glass sheet from the quench ring to the at least one upper support member when the quench ring is positioned between the first lower secondary quench head and the upper secondary quench system, and the fluid supply system is further operable to facilitate transfer of the glass sheet from the at least one upper support member to the at least one lower support member after the quench ring has been returned to a position between the upper and lower main quench heads of the main quench station.

15. The quench arrangement of claim 14 further comprising at least one additional upper support member positioned between the second lower secondary quench head and the upper secondary quench system, wherein the fluid supply system is further configured to supply cooling fluid to the second lower secondary quench head, and the fluid supply system is operable to facilitate transfer of the glass sheet from the at least one lower support member to the at least one additional upper support member when the at least one lower support member is positioned above the second lower secondary quench head.

16. The quench arrangement of claim 15 further comprising an additional fluid supply system for supplying cooling fluid to the upper secondary quench system, wherein the additional fluid supply system is cooperable with the fluid supply system to facilitate transfer of the glass sheet from the at least one additional upper support member to the conveyor located above the second lower secondary quench head so that the glass sheet may be moved away from the second lower secondary quench head.

17. The quench arrangement of claim 16 wherein the upper secondary quench system includes first and second upper secondary quench heads positioned above the first and second lower secondary quench heads, respectively, and the additional fluid supply system includes first and second fluid supply sections connected to the first and second upper secondary quench heads, respectively, and wherein the first and second fluid supply sections are each configured to supply cooling fluid at a variable pressure.

18. The quench arrangement of claim 16 further comprising at least one actuator for moving the first and second lower secondary quench heads toward and away from the main quench station, and for moving the upper secondary quench system toward and away from the main quench station.

19. The quench arrangement of claim 18 wherein the fluid supply system comprises a movable portion configured to adjust length of the fluid supply system, and the additional fluid supply system comprises an additional movable portion configured to adjust length of the additional fluid supply system.

20. The quench arrangement of claim 19 wherein each movable portion is configured as a telescopic portion that includes a pneumatic seal.

21. The quench arrangement of claim 14 wherein the at least one lower support member comprises multiple upright lower support members.

22. The quench arrangement of claim 21 wherein the multiple upright lower support members comprise multiple support tubes or bars.

23. A method for quenching formed glass sheets in a quench arrangement, the method comprising:
moving a quench ring into a bending station to receive a heated and formed glass sheet;
moving the glass sheet on the quench ring from the bending station to a main quench station so that the glass sheet is positioned between upper and lower main quench heads of the main quench station;
supplying cooling fluid through the upper and lower main quench heads to cool the glass sheet;
moving the glass sheet on the quench ring to a position between a first lower secondary quench head and an upper secondary quench system, wherein the first lower secondary quench head is located downstream of the main quench station;
supplying cooling fluid through the first lower secondary quench head and the upper secondary quench system to further cool the glass sheet;
moving the glass sheet to a position between a second lower secondary quench head and the upper secondary quench system, wherein the second lower secondary quench head is located downstream of the first lower secondary quench head;
supplying cooling fluid through the second lower secondary quench head and the upper secondary quench system to further cool the glass sheet; and
moving the glass sheet away from the second lower secondary quench head via a transfer conveyor;
wherein at least one of the first lower secondary quench head, the second lower secondary quench head, or the upper secondary quench system is movable laterally toward and away from the main quench station, based on size of the glass sheet or size of the main quench heads, to facilitate cooling of the glass sheet downstream of the main quench station, and wherein the upper secondary quench system extends over the first and second lower secondary quench heads.

24. The method of claim 23 further comprising increasing relative pressure difference of the cooling fluid between the first lower secondary quench head and the upper secondary quench system, when the glass sheet on the quench ring is positioned between the first lower secondary quench head and the upper secondary quench system, to transfer the glass sheet from the quench ring to an upper conveyor that extends between the first lower secondary quench head and the second lower secondary quench head, wherein moving the glass sheet to the position between the second lower secondary quench head and the upper secondary quench system is performed using the upper conveyor.

25. The method of claim 24 further comprising increasing relative pressure difference of the cooling fluid between the upper secondary quench system and the second lower secondary quench head, when the glass sheet is on the upper conveyor and positioned between the second lower secondary quench head and the upper secondary quench system, to transfer the glass sheet from the upper conveyor to the transfer conveyor.

26. The method of claim 23 wherein the quench arrangement comprises a shuttle associated with the quench ring for moving the quench ring, and wherein the method further comprises increasing relative pressure difference of the cooling fluid between the first lower secondary quench head and the upper secondary quench system, when the glass sheet on the quench ring is positioned between the first lower secondary quench head and the upper secondary quench system, to transfer the glass sheet from the quench ring to at least one upper support member positioned between the first lower secondary quench head and the upper secondary quench system, and subsequently increasing relative pressure difference of the cooling fluid between the upper secondary quench system and the first lower secondary quench head to transfer the glass sheet from the at least one upper support member to at least one lower support member attached to a portion of the shuttle located downstream of the quench ring after the quench ring has been returned to a position between the upper and lower main quench heads of the main quench station.

27. The method of claim 26 wherein moving the glass sheet to the position between the second lower secondary quench head and the upper secondary quench system comprises moving the shuttle, and wherein the method further comprises increasing relative pressure difference of the cooling fluid between the second lower secondary quench head and the upper secondary quench system, when the glass sheet is supported on the at least one lower support member and positioned between the second lower secondary quench head and the upper secondary quench system, to transfer the glass sheet from the at least one lower support member to at least one additional upper support member positioned between the second lower secondary quench head and the upper secondary quench system.

28. The method of claim 27 further comprising reducing relative pressure difference of the cooling fluid between the second lower secondary quench head and the upper secondary quench system, when the glass sheet is positioned against the at least one additional upper support member, to transfer the glass sheet from the at least one additional upper support member to the transfer conveyor.

29. The method of claim 23 wherein the glass sheet is movable through the quench arrangement in a direction of conveyance, and wherein the method further comprises moving the first and second lower secondary quench heads and the upper secondary quench system toward the main quench station in order to facilitate cooling an additional glass sheet having a dimension in the direction of conveyance that is smaller than a corresponding dimension of the glass sheet.

30. The method of claim 29 wherein moving the first and second lower secondary quench heads and the upper secondary quench system toward the main quench station comprises moving the first and second lower secondary quench heads and the upper secondary quench system using one or more roller systems.

31. The method of claim 23 wherein the quench arrangement comprises a fluid supply system for supplying cooling fluid to the at least one of the first lower secondary quench head, the second lower secondary quench head, or the upper secondary quench system, and wherein the fluid supply system includes a movable portion configured to adjust a configuration of the fluid supply system to accommodate movement of the at least one of the first lower secondary quench head, the second lower secondary quench head, or the upper secondary quench system toward and away from the main quench station.

32. The method of claim 23 further comprising selecting the main quench heads based on size of the glass sheet, mounting the main quench heads in the main quench station, and positioning the lower secondary quench heads and the upper secondary quench system relative to the main quench station based on size of the main quench heads.

* * * * *

UNITED STATES PATENT AND TRADEMARK OFFICE
CERTIFICATE OF CORRECTION

PATENT NO.        : 11,987,517 B2
APPLICATION NO.   : 17/421858
DATED             : May 21, 2024
INVENTOR(S)       : James P. Schnabel, Jr. et al.

Page 1 of 1

It is certified that error appears in the above-identified patent and that said Letters Patent is hereby corrected as shown below:

In the Claims

Column 17, Lines 8-9, Claim 1:
After "the second lower secondary quench head,"
Delete "and"

Signed and Sealed this
Twenty-fourth Day of December, 2024

Derrick Brent
*Acting Director of the United States Patent and Trademark Office*